United States Patent
Brooks

(10) Patent No.: US 6,636,928 B1
(45) Date of Patent: Oct. 21, 2003

(54) WRITE POSTING WITH GLOBAL ORDERING IN MULTI-PATH SYSTEMS

(75) Inventor: Robert J Brooks, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/507,205

(22) Filed: Feb. 18, 2000

(51) Int. Cl.⁷ .............................................. G06F 13/00
(52) U.S. Cl. ...................................... 710/310; 710/112
(58) Field of Search ................................ 710/311, 107, 710/315, 310, 112, 52

(56) References Cited

U.S. PATENT DOCUMENTS

| | | | | |
|---|---|---|---|---|
| 5,333,303 A | * | 7/1994 | Mohan ......................... | 714/20 |
| 5,381,545 A | * | 1/1995 | Baker et al. ................... | 714/19 |
| 5,625,775 A | * | 4/1997 | Davis et al. ................... | 710/74 |
| 5,634,023 A | * | 5/1997 | Adler et al. ................. | 712/244 |
| 5,634,034 A | * | 5/1997 | Foster ........................ | 711/202 |
| 5,764,924 A | * | 6/1998 | Hong ........................ | 710/315 |
| 5,805,834 A | * | 9/1998 | McKinley et al. ........... | 710/315 |
| 5,822,556 A | * | 10/1998 | Potter et al. ................. | 712/205 |
| 5,859,999 A | | 1/1999 | Morris et al. ............... | 395/565 |
| 5,860,017 A | | 1/1999 | Sharangpani et al. .. | 395/800.23 |
| 6,032,244 A | * | 2/2000 | Moudgill ..................... | 712/23 |
| 6,098,137 A | * | 8/2000 | Goodrum et al. ........... | 710/311 |
| 6,134,579 A | * | 10/2000 | Tavallaei et al. ............ | 709/100 |
| 6,148,359 A | * | 11/2000 | Elkhoury et al. ........... | 710/107 |
| 6,209,054 B1 | * | 3/2001 | Lee ............................. | 710/310 |
| 6,279,087 B1 | * | 8/2001 | Melo et al. ................. | 711/146 |
| 6,314,472 B1 | * | 11/2001 | Trieu et al. ..................... | 710/5 |

OTHER PUBLICATIONS

Wolfe, Alexander, Electronic Engineering Times, pp. 43–44, 1999.

* cited by examiner

*Primary Examiner*—Paul R. Myers

(57) ABSTRACT

An apparatus and method for permitting write posting with global ordering in a multipath system. The apparatus and method including a bus adapter having an input port to receive one or more operations from a processor. A queue controlled by the bus adapter buffers information from the one or more operations. A control circuit, coupled to the queue, generates an output signal that relates to the information from the one or more operations. The output signal is transmitted to the processor. An interconnect fabric, coupled to each bus adapter, transmits the one or more operations. A device, connected to the interconnect fabric, receives the transmitted operations, where the device sends a acknowledgment signal to the processor upon receiving the transmitted operation.

29 Claims, 4 Drawing Sheets

WRITE POSTING WITH GLOBAL ORDERING IN MULTI-PATH SYSTEMS

TECHNICAL FIELD

The invention relates to write posting in multi-processor systems. More particularly, the invention relates to methods and apparatus for write posting with global ordering in a multi-processor system having multiple paths from multiple processors to a single I/O device.

BACKGROUND ART

Computer systems include a means for CPUs to transmit data to input-output (I/O) units. The transit latency for such transactions is typically high, in the hundreds or thousands of CPUs cycles. In order to maximize the performance of sequences of such transactions, it has become commonplace to employ pipelining, also known as write-posting, in this particular context. With write-posting, a CPU may emit a successor write before the preceding write has progressed all the way to its destination.

Certain challenges to maintaining system ordering can emerge in the context of write-posting. For example, bus protocols frequently include a "retry" mechanism. If two successive posted writes are sent, and the first is retried, the writes may arrive at their destination in the opposite order in which they were transmitted.

Furthermore, in multiple CPU systems, it is generally necessary for writes from different CPUs sent to the same destination to be coordinated. Assuming some ordering relationship between CPUs established by some mechanism, such as a memory semaphore, I/O writes emitted by a CPU ordered first, arrive at the destination before those from a CPU ordered second.

Both of these problems are easily solved in single-bus systems, that is systems in which there is only one path from any CPU to each I/O device. The "retry" problem can be solved by retrying all writes to the same destination once the first is retried, coupled with a protocol requirement that only the oldest retry is reissued until it is accepted. The second situation cannot arise by definition; if there is only one path, arrival order must equal issue order.

Various means have been used to solve the above problem in multi-path systems. One is the use of a special "sync" operation. Here, I/O writes are posted as for a single-path system. But before a handoff permission for a different CPU to begin writing to a device is received, the previously writing CPU issues the "sync". The "sync" acts as a probe to assure that all paths from the issuing CPU to all possible destinations have ben drained. When the probe indicates it is complete, the first CPU indicates to the second CPU, via a semaphore or interrupt, that it may proceed. An ordering fence, either implied or explicit, is used between the sync and the proceed indication. Performance and complexity are the drawbacks to this approach. Complexity increases with attempts to restrict the scope of the sync to the minimum necessary. Performance decreases, the more "heavyweight" and simple the sync operation is.

Another approach is to follow the last write from the first CPU with a read from that CPU to the same destination. An implicit or explicit fence can separate the return of that read with the indication for the next CPU to proceed. The disadvantage here is with software constraints and complexity. Legacy software written for single-path systems where this is not necessary can be difficult to modify. The transfer of control may be managed by a layer of software that is isolated from that doing the writes, thus, the necessity of the read or where to direct it is difficult to determine. An example of this is OS pre-emption and process migration.

Accordingly, a need exists for an apparatus to accommodate write posting with global ordering in multiple path systems.

SUMMARY OF INVENTION

An apparatus and method consistent with the present invention for permitting write posting with global ordering in a multipath system. The apparatus and method including a bus adapter having an input port to receive one or more operations from a processor. A queue controlled by the bus adapter to buffer information from the one or more operations. A control circuit, coupled to the queue, to generate an output signal that relates to the information from the one or more operations. The output signal is transmitted to the processor. An interconnect fabric, coupled to each bus adapter, to transmit the one or more operations. A device, connected to the interconnect fabric, to receive the transmitted operations where the device sends an acknowledgment signal to the processor upon receiving the transmitted operation.

Those skilled in the art will appreciate these and other advantages and benefits of various embodiments of the invention upon reading the following detailed description of a preferred embodiment with reference to the below-listed drawings.

BRIEF DESCRIPTION OF DRAWINGS

The accompanying drawings are incorporated in and constitute a part of the specification and, together with the description, explain the advantages and principles of the invention. In the drawings.

DETAILED DESCRIPTION OF A PREFERRED EMBODIMENT

Figure 1:
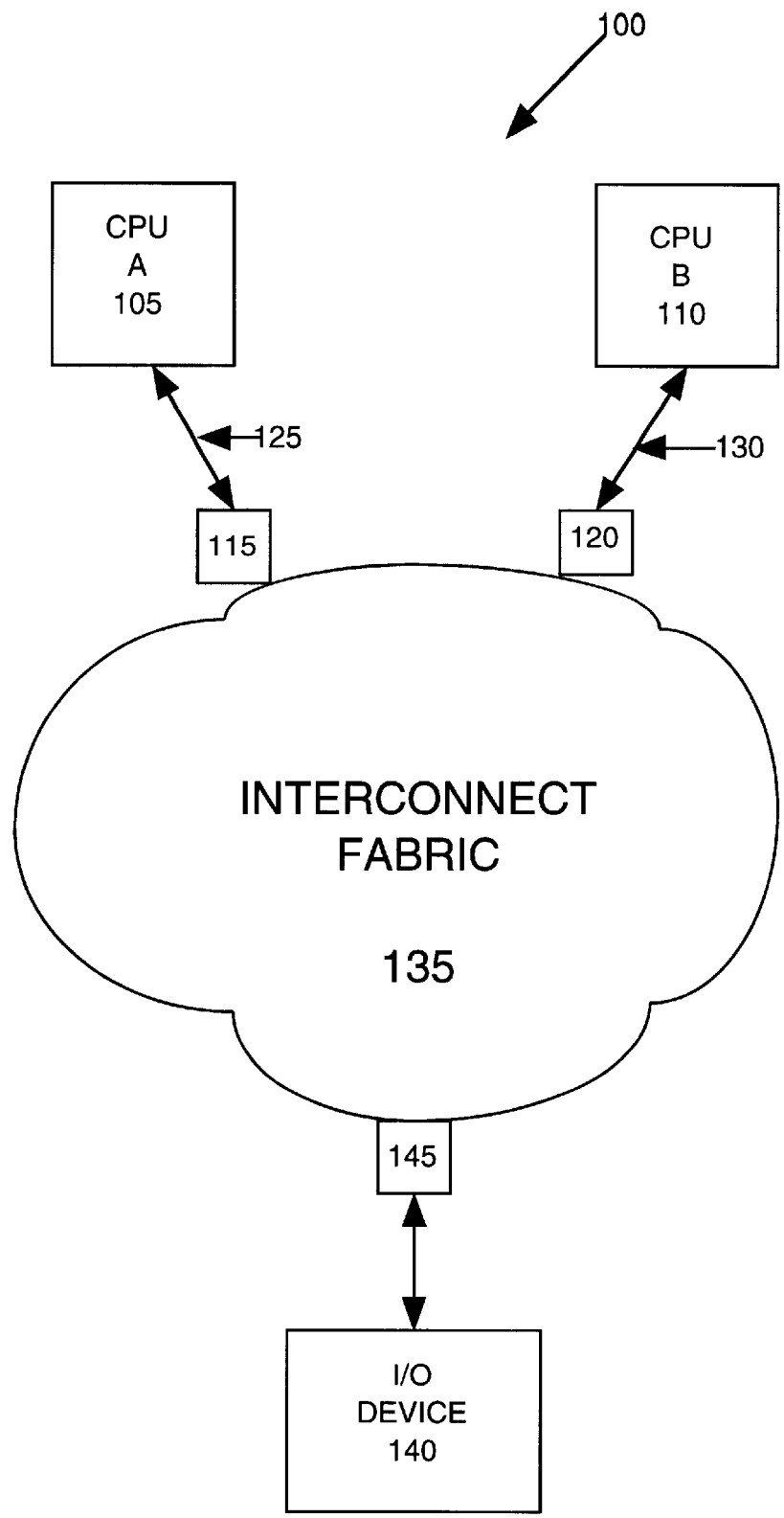
FIG. 1 is a diagram of a multi-processor computer system.

FIG. 1 is a diagram of a multi-processor computer system 100 having multiple paths from multiple processors to a single I/O device. In system 100, a plurality of processors 105, 110 writes to its bus adapters 115, 120 via their processors bus 125, 130, respectively. Processor 105 writes to bus adapter 115 via bus 125 and processor 110 writes to bus adapter 120 via bus 130. Two processors and bus adapters are shown, however, additional processors and bus adapters could be included in the system 100.

The bus adapters 115, 120 are interfaces which receive signals from the processors 105, 110. The processors 105, 110 are connected to an interconnect fabric 135 which could be a mesh, ring, cross bar or other topology. The interconnect fabric 135 is not a simple bus, where only one processor can access it at a time and therefore assure ordering by virtue of that fact. The interconnect fabric 135 has various buffering stages within itself, where the bus adaptors are just the first stage of interconnect to the system's 100 interconnect fabric 135. Also connected to the interconnect fabric 135 is an I/O device 140. The I/O device 140 is connected to the interconnect fabric 135 via bus adapter 145. The I/O device 140 gives the processors 105, 110 access to other parts of the system 100. Examples of I/O devices 140 are disc drives and graphic displays.

Figure 2:
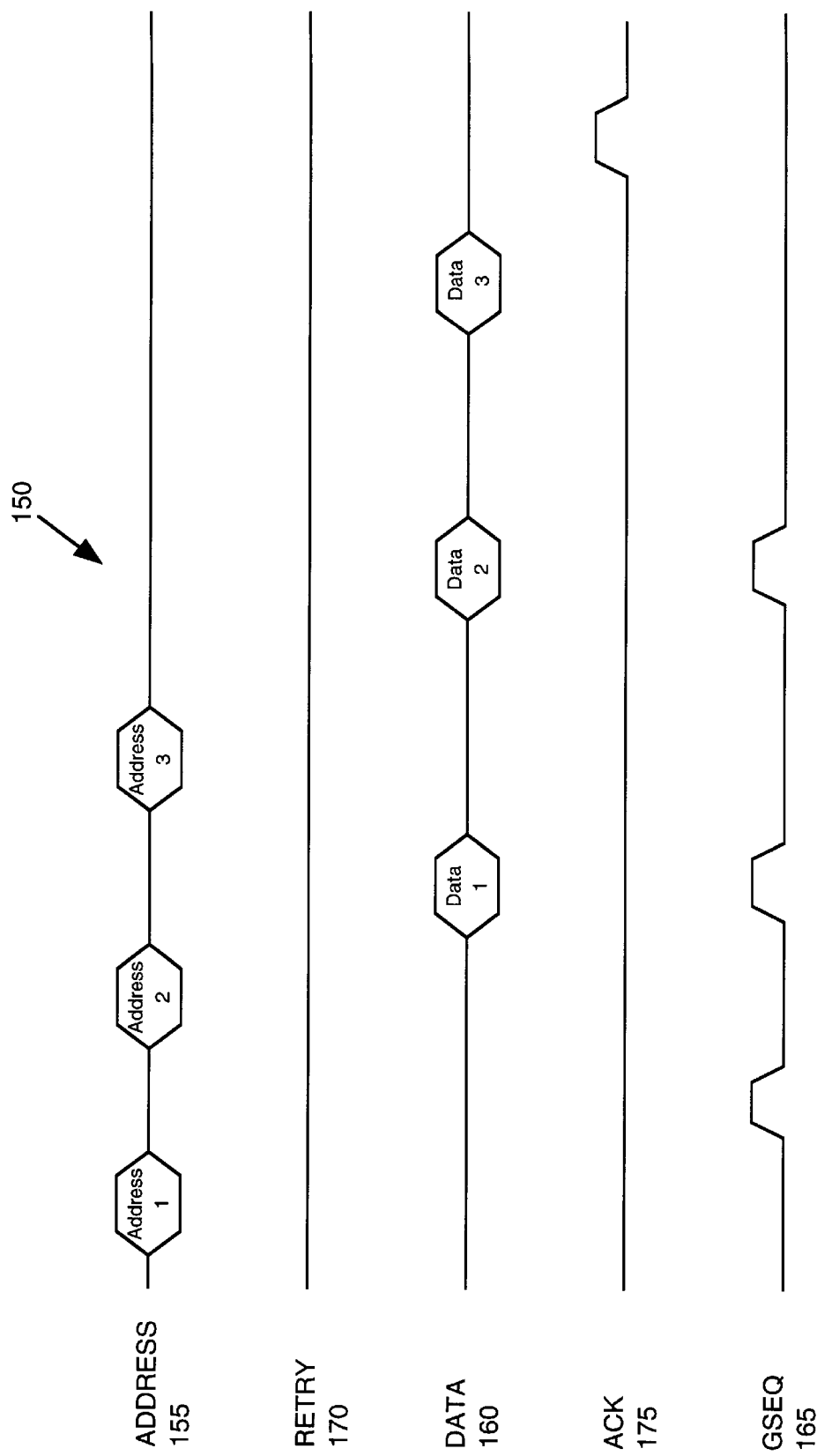
FIG. 2 is a timing diagram for a GSEQ signal.

FIG. 2 is a timing diagram 150 of a guaranteed sequentiality signal. Initially, the processor 105 writes an address 155 of a memory the processor 105 is accessing. One address typically represents a packet of 32, 64 or 128 bites of data. Shortly after the first address 155 is sent, guaranteed sequentiality (GSEQ) signals 165 are generated by the bus adaptor 115 based on queue status within each bus adaptor. Subsequently, data 160 for the first write is sent. The GSEQ signals 165 may be sent before or after the data 160 is sent. Each bus adaptor 115 is driving the GSEQ signal 165 rapidly after an address emerges. The GSEQ signal 165 notifies the processor 105 it can send out successive addresses in order, rapidly and then data corresponding to the addresses shortly thereafter, in a pipeline fashion. The bus adapter 115 is guaranteeing sequentiality via the GSEQ signal 165, that successive operations from the same processor 105 remain in that order. Sequentiality means that instructions from processor 105 are all arriving at the I/O device 140 in the order of issuance. The bus adapter 115 only generates the GSEQ signal 165 if it knows it will not issue a retry signal 170.

In addition to the GSEQ signal 165, the system 100 also can issue the retry signal 170 that is generated by each bus adapter based on the queue status within each bus adaptor. The retry indicates a queue full signal or similar resource constraint. Since the GSEQ signal 165 is a function of the number of entries available in the queue, the GSEQ signal 165 indicates that enough entries are still available. If the queue is full, then the retry signal 170 is sent to the processor 105 to resend the transaction, but if there are enough entries available in the queue, then the GSEQ signal 165 is asserted and guarantees acceptance of that transaction without retrying. The processors 105, 110 can then send out the next address.

Assuming that the retry signal 170 was not sent, the data 160 for the transaction would be sent, and that might or might not be on the same set of wires. Frequently its efficient to have the data to be on a different set of wires then the address. Since these are write transactions, a processor is sending out both the address and the data. In some implementations, address and data are multiplexed under the same wires, and in other implementations they are separate. At some point, assuming there was no retry 170, data 160 is sent out and some time later the I/O device 140 has received the data 160, either the I/O device 140 or the I/O device's 140 bus adaptor 145 that is immediately up stream from the I/O device 140, sends an acknowledgment 175. The acknowledgment 175 comes back to the processors after the I/O device 140 has received the data 160.

The system 100 maintains sequentiality by using the GSEQ signal 165 to send all the addresses 155 one after another and then the processor 105 waits until it gets the acknowledgment 175 back from the I/O device 140 after the processor 105 has sent the last address. This eliminates the need to add special read operations to follow the last write. If the processor 105 does not receive the GSEQ signal 165, it will wait until the point in time the retry 170 may or may not be signaled. If the retry 170 is not signaled, then the processor 105 goes ahead and sends address 2. If the retry 170 is signaled, then the processor 105 sends out address I again, and that time it might receive the GSEQ signal 165. A sequentiality commit point is the point at which it is known the transaction will not be retried.

The acknowledgment 175 is being sent by either the I/O device 140 itself or the bus adaptor 145 for the I/O device 140, such that the connection between the bus adaptor 145 and the I/O device 140 is a single path. The acknowledgment 175, when it is received by the processor 105 is at an ordering commit point. The ordering commit point is the point at which a given write transaction cannot be passed by any other write transaction. Therefore, the processor 105 knows, when it received an acknowledgment 175 that the data 160 sent was successfully received by the I/O device 140.

If the processor 105 issues an order dependant operation, such as a semaphore, the processor 105 will wait for any outstanding acknowledgments 175, even though the processor 105 has sent off multiple writes rapidly in order. If the processor 105 executes a semaphore operation it will stall until all the acknowledgments 175 have come back. So if the operation requires another processor 115 it has to wait for the acknowledge 175 to ensure proper order. The system 100 is using ordering semantics attached to a semaphore to essentially lock out the bus. This is how the system 100 can safely hand off control of one path to a different processor and ensure that the operations don't get interlaced. This enables the system 100 to maintain ordering between the multiple processors.

Figure 3:
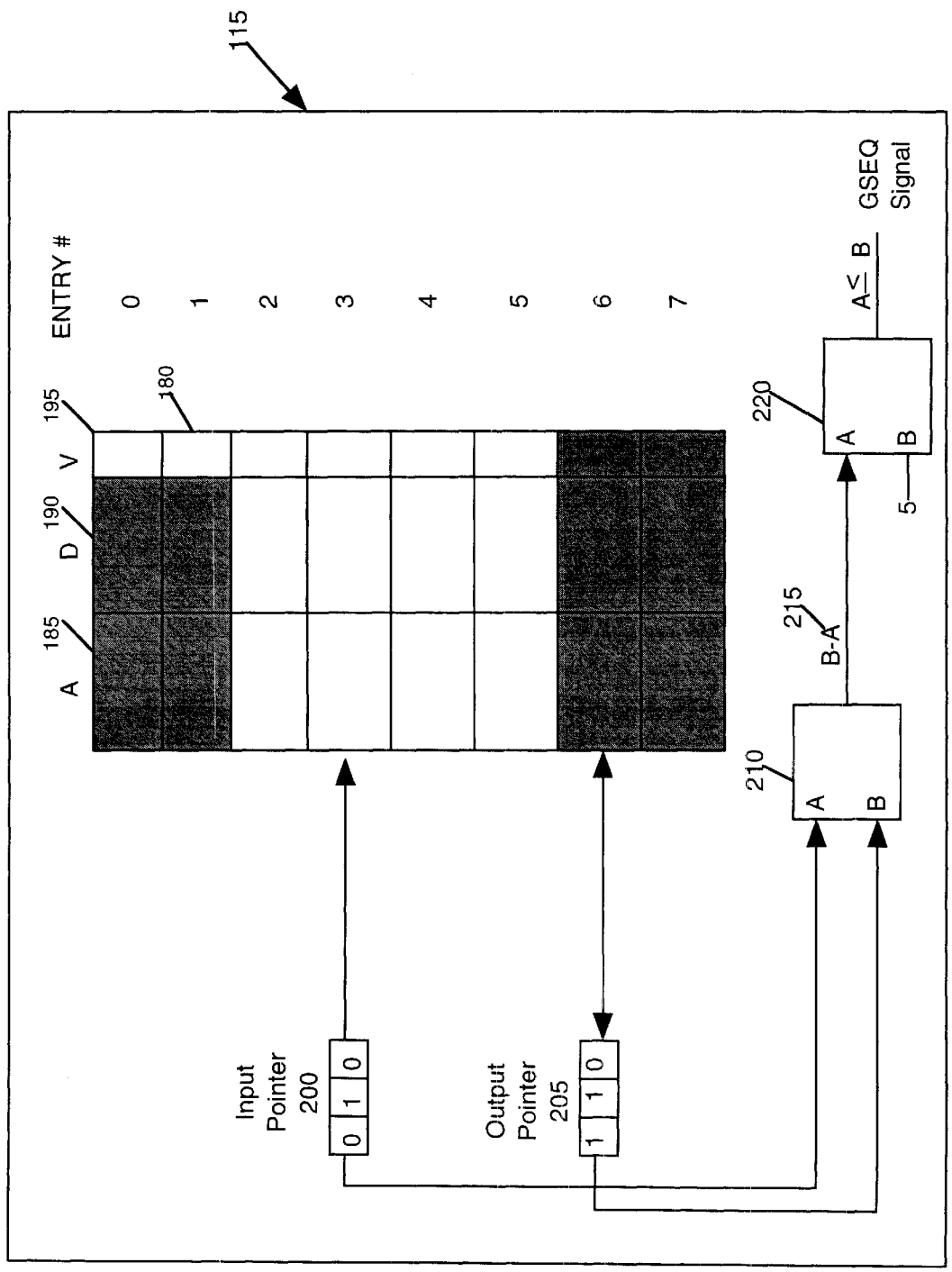
FIG. 3 is a diagram of a bus adapter implementing the GSEQ signal.

FIG. 3 is a diagram of the bus adapter implementing the GSEQ signal. Guaranteed sequentiality is implemented by adding some additional logic gates to each bus adaptor 115, 120 to enable each bus adapter to determine whether the GSEQ signal 165 should be sent. The address and data buses from the processor enter the bus adaptor. Each bus adaptor contains a queue 180 that the addresses and data enter. As an example, FIG. 3 illustrates an eight entry queue 180. The queue 180 contains the address 185 and data 190 and it may also contain a valid bit 195, although the valid bit 195 is not necessary for the particular implementation of the GSEQ signal 165 generation.

The queue 180 also contains an input pointer 200 which points to the next entry to be occupied with the incoming data. The queue 180 also has an output pointer 205 which points to the last occupied entry to go out to the interconnect fabric 135. Alternatively, as an implementation choice, the input and output pointers 200, 205 could have a pre-increment on the pointer as to whether it is actually occupied or not. No matter the implementation, both the input and output pointers 200, 205 continually increment such that, the pointers wrap around. The pointer values enter a substracter 210 and the result 215 of that subtraction is the number of entries that are occupied in the queue 180. In the present example, the white boxes represent the number of available entries in the queue 180 and the shaded boxes indicate occupied entries in the queue 180.

In the example, the input pointer 200 is pointing to entry 2 and the output pointer 205 is pointing to entry 6. The result 215 of 6 minus 2 is 4 entries are occupied within the queue 180. That result 215 is compared by a comparator 220 to a fixed subset of the queue 180, in this case 5 entries. Since the queue 180 has less than or equal to 5 entries occupied within it, the bus adaptor 115 drives the GSEQ signal 165 notifying the processor 105 it can accept more transactions. If the number of occupied entries is equal to the number of total entries available in the queue 180, then the retry signal 170 would be sent to the processor 105 to indicate the queue 180 is filled up.

Figure 4:
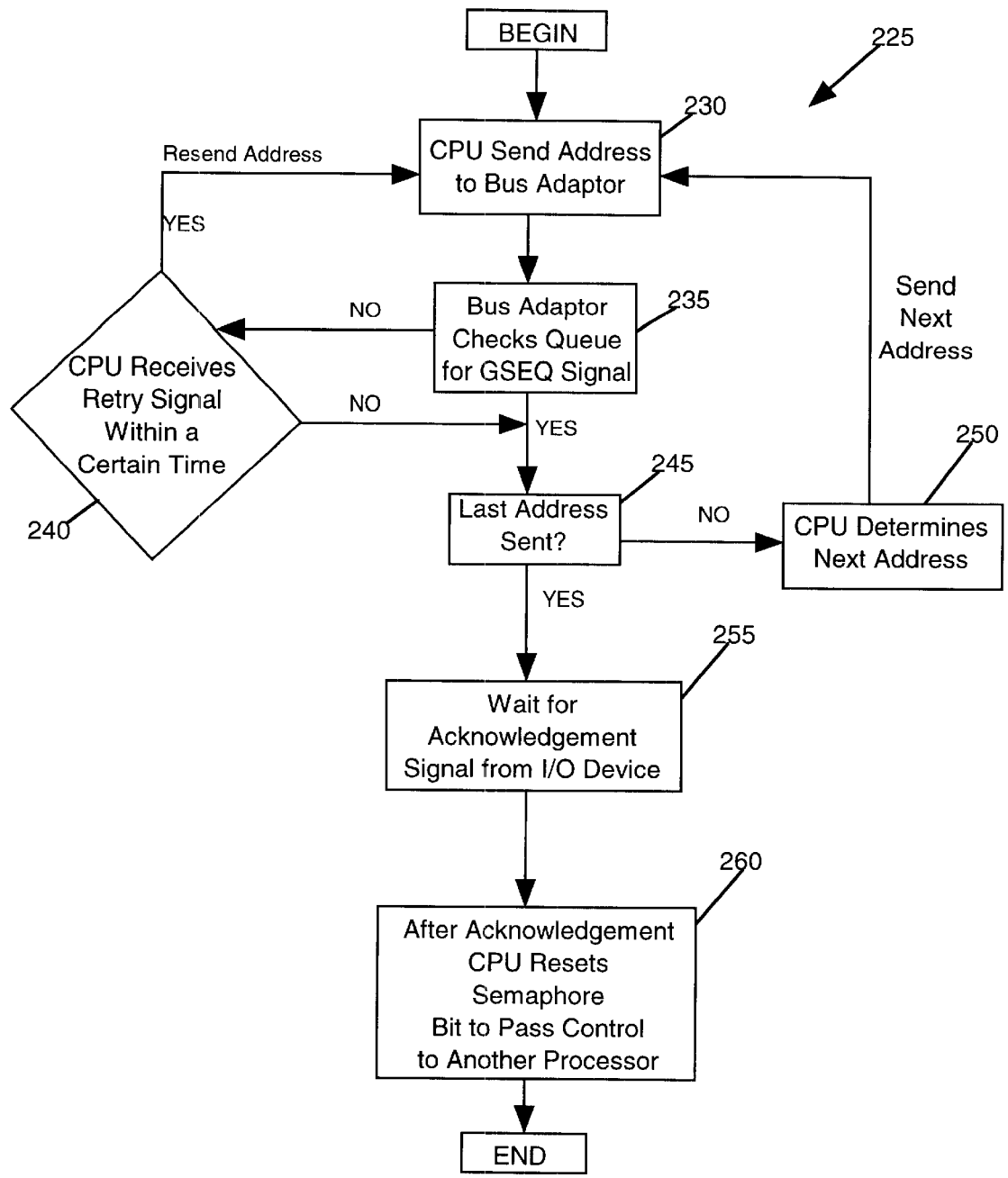
FIG. 4 is a flow chart of a process for implementing the GSEQ signal in the multiple processor computer system.

FIG. 4 is a flow chart illustrating a process of bus adapter 115 implementing the GSEQ signal 165. The bus adapter 115, as explained above with respect to FIGS. 2 and 3, typically implements these functions using hardware modules. However, it may also alternatively implement these functions in software or firmware. In process 225, the processor 105 sends a write transaction to its bus adaptor 115 (step 230). The bus adaptor 115 checks the queue 180 to determine if the GSEQ signal 165 should be sent to the processor 105 (step 235). If the GSEQ signal 165 cannot be sent to the processor 105, the processor may receive a retry signal 170 (step 240). The processor 105 can then resend address 1 to the bus adaptor 115. If the GSEQ signal 165 can be sent, the processor 105 determines if that was the last address it wants to send (step 245). If it is not the last address, the processor 105 determines the next address (step 250) and sends the next address to the bus adaptor 115. If the last address was sent, then the processor waits for an acknowledge signal 175 from the I/O device 140 or from the I/O device's bus adaptor 145 (step 255). Upon receiving the acknowledge signal 175, the processor 105 resets the semaphore bit to pass control to processor 110 (step 260). The determination of "last address sent" might not be made by the same software process or layer, as is sending the writes. For example, an operating system might interrupt and suspend the sending process, and reschedule that process on a different processor.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. An apparatus for write posting in multiprocessor systems, the apparatus comprising:
   (a) a bus adapter having an input port to receive one or more operations from a processor;
   (b) a queue to buffer information from the one or more operations, wherein the queue is controlled by the bus adapter; and
   (c) a control circuit, coupled to the queue, to generate an output signal to be transmitted to the processor, wherein the output signal relates to execution of the one or more operations, wherein the posted write operation comprises both an ordering commit point and a sequentiality commit point and wherein the sequentiality commit point is a point at which it is known the operation will not be retried.

2. The apparatus of claim 1, wherein the output signal relates to a sequence of the one or more operations.

3. The apparatus of claim 1, wherein the output signal prompts issuance of another operation, wherein the output signal is mutually exclusive of a retry signal later in the transaction.

4. The apparatus of claim 1, wherein the control circuit determines number of entries available in the queue.

5. The apparatus of claim 4, wherein the queue sends a retry signal to the processor if sufficient entries are not available in the queue, wherein the retry signal is mutually exclusive of a signal prompting the issuance of another transaction having occurred earlier in the transaction.

6. The apparatus of claim 1 further comprising a device coupled to the bus adapter through an interconnect fabric, wherein the device receives the one or more operations.

7. The apparatus of claim 6, wherein the device transmits an acknowledgment signal to the processor upon receiving the one or more operations.

8. An apparatus for write posting, the apparatus comprising:
   (a) multiple processors, wherein each processor is coupled to a bus adapter to send one or more operations to the bus adaptor;
   (b) a queue, coupled to the bus adapter, to generate an output signal relating to the one or more operations, wherein the output signal relates to information from the one or more operations;
   (c) an interconnect fabric, coupled to each bus adapter, to transmit the one or more operations; and
   (d) a device, connected to the interconnect fabric, to receive the transmitted operations, wherein a transmitted write operation comprises both an ordering commit point and a sequentiality commit point and wherein the sequentiality commit point is a point at which it is known the operation will not be retried.

9. The apparatus of claim 8, wherein the device transmits an acknowledgment signal to the processor upon receiving the transmitted operations.

10. A method for write posting in a multiprocessor system, the method comprising the steps of:
    (a) sending one or more operations by a processor;
    (b) receiving information in a queue from the one or more operations;
    (c) executing the information of the one or more operations; and
    (d) generating an output signal relating to the step of executing the information, wherein the output signal has semantics where assertion of the output signal signifies a sequentiality commit point, the sequentiality commit point being potentially distinct from an ordering commit point later in the operation and wherein the sequentiality commit point is a point at which it is known the operation will not be retried.

11. The method of claim 10, wherein the information is address and data.

12. The method of claim 10, wherein the step of generating the output signal relates to a sequence of the one or more operations.

13. The method of claim 12, wherein the step of generating the output signal prompts issuance of another operation.

14. The method of claim 10, wherein the step of executing the information determines number of entries available within the queue.

15. The method of claim 14, wherein the step of executing sends a retry signal to the processor if sufficient entries are not available within the queue.

16. The method of claim 10, further comprising transmitting the one or more operations to a device.

17. The method of claim 16, wherein the step of transmitting sends an acknowledgment signal to the processor upon receiving the transmitted one or more operations.

18. The method of claim 17, wherein the step of receiving the acknowledgment signal, the processor resets a semaphore bit.

19. The method of claim 18, wherein the step of resetting passes control from one processor to another processor.

20. An apparatus for write posting in multiprocessor systems, the apparatus comprising:
    (a) a bus adapter having an input port to receive one or more operations from a processor;
    (b) a queue to buffer information from the one or more operations, wherein the queue is controlled by the bus adapter;
    (c) a control circuit, coupled to the queue, to generate an output signal to be transmitted to the processor, wherein the output signal relates to execution of the one or more operations; and
    (d) an output signal having semantics where assertion of the output signal signifies a sequentiality commit point, the sequentiality commit point being potentially distinct from an ordering commit point later in the operation and wherein the sequentiality commit point is a point at which it is known the operation will not be retried.

21. The apparatus of claim 20, wherein presence of an output signal signifying the sequentiality commit point of an operation prohibits events in a remaining duration of the operation, wherein prohibited events could alter the output signal's sequentiality relationship with other operations.

22. The apparatus of claim 21, wherein the prohibited event is a retry.

23. The apparatus of claim 20, wherein a lack of assertion of the output signal signifying a sequentiality commit point means that the sequentiality commit point is defined by a later occurring event in the life of the operation.

24. The apparatus of claim 23, wherein the later occurring event is an ordering commit point of the transaction.

25. The apparatus of claim 24, wherein the ordering commit point is an acknowledgement that the operation has reached a critical point.

26. The apparatus of claim 25, wherein the critical point is a point in an interconnect fabric from which there is only a single path from that critical point to a destination.

27. A system of multiple producers of posted writes to a single consumer, comprising:

(a) at least two processors producing posted writes;

(b) a plurality of write posting apparatuses, wherein each unique write posting apparatus is connected to one of the at least two processors, wherein the write posting apparatus comprises:

a bus adapter having an input port to receive one or more operations from a processor;

a queue to buffer information from the one or more operations, wherein the queue is controlled by the bus adapter;

a control circuit, coupled to the queue, to generate an output signal to be transmitted to the processor, wherein the output signal relates to execution of the one or more operations; and an output signal having semantics where assertion of the output signal signifies a sequentiality commit point, the sequentiality commit point being potentially distinct from an ordering commit point later in the operation and wherein the sequentiality commit point is a point at which it is known the operation will not be retried; and (c) an interconnect fabric connecting each instance of the plurality of write posting apparatuses, wherein the interconnect fabric also connects to a destination device, and wherein paths from each processor to the destination device differ.

28. A method for posted writes in a multiple path multi-processor system, the method comprising the steps of:

posting, by a first processor, one or more writes to a destination device;

posting, by a second processor, one or more writes to the destination device, wherein the second processor is programmed such that the one or more writes of the second processor reach the destination device after the writes posted by the first processor;

executing, by the first processor, an ordered operation after transmitting a last in sequence of the one or more writes;

stalling the ordered operation until ordering of commit points for each previously issued operation of the first processor have occurred; and proceeding, by the second processor, with the one or more writes to the destination device.

29. The method as recited in claim 28, wherein the executing, by the first processor, an order operation, further comprises generating, by the first processor, a completion indication, and wherein proceeding, by the second processor, further comprises observing, by the second processor, the completion indication.

* * * * *